(12) United States Patent
Arnold

(10) Patent No.: US 6,972,065 B1
(45) Date of Patent: Dec. 6, 2005

(54) PROCESS FOR PRODUCTION OF A DIELECTRIC MULTI-LAYERED REFLECTING COATING

(75) Inventor: Jörg Arnold, Heidelberg (DE)

(73) Assignee: IP2H AG, Bern (CH)

( * ) Notice: Subject to any disclaimer, the term of this patent is extended or adjusted under 35 U.S.C. 154(b) by 0 days.

(21) Appl. No.: 10/089,635

(22) PCT Filed: Mar. 24, 2000

(86) PCT No.: PCT/DE00/00913

§ 371 (c)(1),
(2), (4) Date: Jul. 9, 2002

(87) PCT Pub. No.: WO01/23915

PCT Pub. Date: Apr. 5, 2001

(30) Foreign Application Priority Data

Sep. 29, 1999 (DE) ................................. 199 46 793

(51) Int. Cl.⁷ ............................................ C03B 13/10
(52) U.S. Cl. ..................... 156/196; 156/312; 65/106
(58) Field of Search ................................ 156/196, 103, 156/312

(56) References Cited

U.S. PATENT DOCUMENTS

| | | | |
|---|---|---|---|
| 3,697,153 A | 10/1972 | Zycha | |
| 3,711,176 A | 1/1973 | Alfrey, Jr. et al. | |
| 4,430,288 A | 2/1984 | Bonis | |
| 4,735,669 A | 4/1988 | Guida et al. | |
| 4,937,134 A | 6/1990 | Schrenk et al. | |
| 4,975,103 A | 12/1990 | Ackermann et al. | |
| 5,697,192 A | 12/1997 | Inoue | |
| 6,393,868 B1 * | 5/2002 | Krauss et al. | ................... 65/23 |

FOREIGN PATENT DOCUMENTS

| | | |
|---|---|---|
| DE | 2050650 | 6/1971 |
| GB | 2232498 A | 12/1990 |
| WO | WO 94/10589 | 5/1994 |

* cited by examiner

*Primary Examiner*—Blaine Copenheaver
*Assistant Examiner*—Barbara J. Musser
(74) *Attorney, Agent, or Firm*—Alston & Bird LLP

(57) ABSTRACT

A method of producing a dielectric multilayer mirror coating is characterized with a view to increasing the coefficient of reflection by the following steps: to begin with, at least two dielectric layers of predetermined initial thicknesses are produced. Subsequently, the layers are arranged one above the other for forming a layered stack. Finally, the thickness of the stack of layers and thus the thicknesses of the individual layers are reduced by deforming the layered stack while maintaining the thickness ratio or ratios of the layers relative to one another.

17 Claims, No Drawings

PROCESS FOR PRODUCTION OF A DIELECTRIC MULTI-LAYERED REFLECTING COATING

BACKGROUND OF THE INVENTION

The invention relates to a method of producing a dielectric multilayer mirror coating.

Dielectric multilayer mirror coatings, i.e., mirror coatings consisting of a plurality of dielectric layers have been used for a long time for a spectrally selective conveyance of reflection or transmission in the case of optical windows and other optical components and devices. Furthermore, it is known to apply a mirror coating to bulbs of lamps. The object of such mirror coatings always consists in reflecting certain portions of radiation, whereas certain other portions of radiation are transmitted with certain other wavelengths.

In a conventional method, such multilayer mirror coatings are produced by applying individual dielectric layers, which are generally composed of two different dielectric materials and have, if possible, different indices of refraction. In general, the layers are applied by vacuum evaporation or by precipitation from a solution. The mirror coating is then produced in that a double layer consisting of, for example, two different materials is layered several times, so as to result in a periodic sequence of the different layers.

The different layers must have a layer thickness that is to be kept exactly within narrowest tolerances for purposes of achieving the required mirror quality and spectral reflection- and transmission characteristic. Normally, optical layer thickness means the geometric layer thickness, which is multiplied by the refractive index of the dielectric material of the layer. The optical thickness may vary from double layer to double layer in a predetermined manner.

The conventional production process of such dielectric multilayer mirror coatings is complicated. For example, costly and expensive high-vacuum evaporation plants are used. In this process, it is necessary to apply the layers individually, one after the other. Furthermore, the mirror coating process can be performed only within the scope of a batch production. A mass production within the scope of an assembly line production is not possible in the case of the closed high-vacuum evaporation technique. Furthermore, the mirror quality that can be obtained by applying the layers individually one after the other is limited. In a conventional manner, it is possible to apply to curved surfaces on a commercial scale only at most as many as 70 dielectric layers or 35 dielectric double layers. With that, it is possible to obtain for a broadband mirror coating a reflection coefficient of 0.7. In the conventional method, an all around extending dielectric multilayer mirror coating of, for example, cylindrical objects is technologically not possible. With that, it is possible to apply dielectric multilayer mirror coatings by evaporation only to flat or little curved surfaces such as, for example, lens surfaces.

In summary, it is possible to achieve with known multilayer mirror coatings, a reflection coefficient of at most 0.7.

It is therefore an object of the present invention to describe a method of producing a dielectric multilayer mirror coating, which permits realizing in a simple manner a multilayer mirror coating with an increased coefficient of reflection.

SUMMARY OF THE INVENTION

In accordance with the invention, the foregoing object is accomplished by a method of producing a dielectric multilayer mirror coating wherein at least two dielectric layers are initially produced, with each layer having a predetermined initial thickness. Subsequently, the layers are arranged, one above the other, to form a stack. Finally, the thickness of the layered stack and thus the thicknesses of the individual layers are reduced by deforming the layered stack while maintaining the thickness ratio or ratios of the layers relative to one another.

In a way according to the invention, it has been recognized that besides the known methods of producing a dielectric multilayer mirror coating—vapor depositing individual layers or precipitating layers from a solution—there also exists a further possibility of producing dielectric multilayer mirror coatings, wherein lastly the desired number of layers is initially arranged one above the other to form a layered stack. In so doing, it is essential that the thicknesses of the layers be selected such that the thickness ratios of the layers relative to one another are correct. The individual layers may be much thicker than in the final state of the mirror coating, which simplifies handling of the individual layers considerably. In the further process, the thickness of the layered stack or the thicknesses of the individual layers are considerably reduced, if need be, by a deformation step. However, the thickness ratios of the layers relative to one another remain unchanged. In other words, the layered stack is predetermined "macroscopically," so as to be present "microscopically" upon completion of the production process.

In the production method of the present invention, a technical limitation of the maximum number of layers to the range of 70 individual layers or 35 double layers is nonexistent. Consequently, it is possible to reflect in a predetermined wavelength interval, the wavelengths of which are, for example, to be reflected, a substantially larger number of wavelengths, to which individual layers or double layers are respectively associated for reflection. In this connection, it is quite realistic to use, for example, 400 double layers. This results in a considerably higher reflection coefficient than the reflection coefficient of 0.7 that has so far been reachable.

Consequently, the method of the present invention for producing a dielectric multilayer mirror coating defines a method, which permits realizing in a simple manner a multilayer mirror coating with an increased coefficient of reflection.

Within the scope of producing the dielectric layers, the initial thicknesses of the layers are predetermined. In this connection, the initial thicknesses of at least two layers could be different. When more than two layers are provided, all layers could be differently thick, or even groups of layers could have the same thickness. Any combination is possible, with the thicknesses having to be adapted to the wavelengths of the radiation that is to be reflected.

In a particularly simple manner, it would be possible to make at least one layer from glass or plastic. In this connection, combinations of glass and plastic or even uniform layered stacks of glass and plastic are possible.

For an effective reflection of the desired radiation, at least two layers could have different indices of refraction. However, it would also be possible that all layers have different indices of refraction.

Furthermore, a double layer could be produced from two layers. In a further development, it would be possible to stack at least two double layers, with the optical layer thickness varying from double layer to double layer.

Concretely, the arrangement of the layers, one above the other, could be a stacking of the layers. As an alternative thereto, the arrangement could also comprise a roll-up of the layers. In this instance, two layers are initially stacked one above the other, and then rolled up as one. With that, it would be possible to obtain a regular sequence of the one and the other layer.

As regards a high mechanical stability of the mirror coating, the stack of layers may be arranged between two base layers before the deformation and so as to form a "sandwich" block. The layer thickness of the base layers determines the subsequent thickness of the deformed composite material from the layered stack and base layers. The use of thick base layers, which are also deformed at the end of the production process, ensures the necessary tolerance of the individual layer thicknesses after the deformation process, since the attainable layer thickness tolerance of the deformation process is to be related to the thickness of the composite material after the deformation process.

As regards a simple handling of the base layers, at least one base layer could be formed from a plurality of individual layers. Such individual layers could be arranged on a preceding layer, preferably melted thereto step by step, each time subsequent to a partial deformation process.

In a simple manner, the base layers or individual layers could be formed from glass. With that, it would also be possible to have a base layer in the form of base glass block.

For a reliable optical connection of the layers, it would be possible to join the layers by fusing them together after arranging them one above the other. To prevent air bubbles from forming between the individual layers, the fusion could occur under vacuum. However, the bonding temperature should be reached and maintained only a short time, for purposes of avoiding a diffusion or a convective transportation of the different layer constituents into the adjoining different layers and, thus, a blurring of the difference in the refractive index of the different layers.

As regards the deformation of the layered stack and, if need be, of the base layers, different methods are possible. On the one hand, deformation could occur by pressing. As an alternative thereto, deformation could occur by rolling, wherein likewise a kind of pressing is, applied. In a further alternative, deformation could occur by a drawing operation of the layered stack. All methods permit reducing the layer thicknesses to the necessary, very small layer thicknesses, while maintaining the layer thickness ratios.

A simplified deformation could occur by the action of heat. However, in this instance, one should observe that the applied temperatures be not too much above the temperature of the mechanical yield point of the layer materials, so that no unwanted material transportation by, for example, diffusion or convection, leads to a penetration or intermixing of the different layer materials, thereby removing or deforming unintentionally the geometric limits that are to be maintained.

For a most extensive prevention of any diffusion- or convection processes, the deformation could occur without supplying additional heat.

As regards an economically interesting application, it would be possible to produce from the deformed stack of layers, tubes or curved panes. Tubes could be used, for example, as a source material for lamp bulbs. Curved panes could be used in the manufacture of automobiles.

In the presence of base layers it will be advantageous, when the layered stack or the actual dielectric multilayer is located very close below one of the surfaces of the composite material, namely in the vicinity of an inner surface of the tubes or curved panes. With that, it is possible to attain a high degrees of reflection of, for example, infrared radiation that is produced in the interior, with a residual absorption of the infrared radiation being minimized in the composite material consisting of base layers and the layered stack.

On the one hand, the multilayer mirror coating may be realized within the scope of a multilayer mirror. In this instance, the layered stack is quasi self-supporting without any further base layers.

As an alternative thereto, the multilayer mirror coating could be realized within the scope of a multilayer mirror coating on a base body. In this instance, the layered stack is arranged on an essentially supporting base body or an individual base layer.

A third alternative, namely the possibility of arranging the layered stack between two base layers has already been described further above. In this instance a base structure is provided on both sides of the layered stack.

The method of present invention permits producing mirror coatings, which may be subjected to a further uniform deformation—for example, the production of cylindrical tubes or curved window panes—without interfering with the mirror characteristics or the dielectric layer ratios. Thus, it is possible to produce, for example, dielectric multilayer jackets for, for example, cylindrical lamp bodies or lamp bulbs. This again permits separating the mirror coating of, for example, lamps, as a production step from the lamp production itself. Furthermore, it is possible to produce flat glass panes, automobile glass panes, automobile headlight panes or lamp bulbs, which already bring along the required mirror coating properties in a material-inherent fashion, so as to omit the mirror coating process of such objects as a separate production step. The mirror coating properties are determined by the arrangement of the layers of quasi any desired thickness and quasi any desired periodic sequences.

Extensive tests were conducted with respect to the glass technological use of a dielectric multilayer glass material. The production process of a dielectric multilayer material is advantageously divided into three production steps. In a first production step, a multilayer glass stack is produced. In a second production step, this stack is rolled out to a flat glass, and in a third production step, tubes for the lamp production or production of lamp bulbs are manufactured from the flat glass material.

In the modern lamp technology, it will be advantageous, when the lamp bulb reflects a large portion of the heat radiation emitted by a filament or glow wire again back to the filament or glow wire. This enables a backheating of the filament or glow wire, whereby it is made possible to supply for reaching the same filament- or glow wire temperature, less electrical energy to the filament or glow wire than in conventional lamps without reflecting bulbs. The more heat radiation can be reflected from the inner side of the lamp bulb, the more favorable the conversion efficiency between supplied electrical power and radiated and transmitted visible light of the filament or glow wire. Consequently, in the case of modern lamps, a high coefficient of reflection for heat radiation, i.e. for radiation in a certain wavelength interval is desired. The multilayer mirror coating produced in accordance with the invention allows to achieve a very high coefficient of reflection in the desired wavelength interval.

To this end, multilayer glass stacks are prepared in accordance with the required optical reflection- or transmission characteristics. The spectral transmission range should be, for example between the wavelengths $\lambda_0$ and $\lambda_1$. The spectral range of reflection should be, for example, between the wavelengths $\gamma_1$ and $\gamma_2$. For a broadband reflection with a high coefficient of reflection between the wavelengths $\lambda_1$ and $\lambda_2$, the individual layer thicknesses $d_i$ are increased continuously or stepwise between the layer thickness limits $d_1 = k\lambda_1/(4n_{11})$ and $d_2 = k\lambda_2/(4n_{21})$ with the respective refraction indices $n_i$ of the two different types of glass in use. In this instance, the $\lambda/4$ condition of the optical path applies, where k is the dilatation factor of the glass stack thickness during the entire rolling process.

However, for the layer thickness limit $d_2$ and, thus, for the band width of the reflection, the marginal condition is that $d_2 < k3\lambda_0/(4n_{01})$, because otherwise the light of the limit wavelength $\gamma_0$, which is to be maximally transmitted is likewise maximally reflected. For a refractive index averaging $n_0 = 1.59$ with the short-wave transmission limit $\lambda_0 = 0.4$ $\mu$m, the long-wave reflection limit with a there assumed mean refractive index of $n_2 = 1.53$ is $\lambda_2 = 3\lambda_0 n_2/n_0 = 1.15$ $\mu$m.

However, this applies only to portions of radiation with a vertical incidence on the mirror coating. For portions of radiation, which strike the mirror coating at a different angle of incidence, the short-wave reflection limit shifts toward shorter wavelengths, and the long-wave reflection limit toward longer wavelengths. For this reason, it is possible to attain in the case of a required transmission range from 400 nm to 700 nm in total, reflection ranges from about 700 nm to about 2 g with a high reflectivity.

The here proposed production method allows to use a very large number of dielectric layers, which may amount to more than 50, and typically to several hundred dielectric layers. As a result, it is possible to use a small difference in the refractrive index of low refracting glass types, because the larger possible number N of dielectric double layers compensates the small differences in the index of refraction, so that one can expect a high coefficient of refraction $R_{2N+1} = (1 - n_1/n_2^{2N})^2/(1 + n_1/n_2^{2N})^2$. For example, for 400 double layers in 10 stepped stacks with the two mean indices of refraction in the spectral reflection range of 1.5 for crown glass and 1.6 for heavy crown glass relative to air with the refractive index of 1, it is possible to estimate a maximum coefficient of reflection of 0.98.

For fusing together the multilayer glass stack, a vacuum melting process is used to prevent air bubbles from forming between the glass layers. The bonding temperature should be reached and held only for a short time for purposes of suppressing a diffusion or a convective transportation of the different glass constituents into adjoining, different glass layers and, thus, a blurring of the difference in the refractive index of the different glass layers.

The actual multilayer glass stack that defines the reflection characteristic, is put together between two base glass blocks, whose layer thicknesses determine the subsequent thickness of the rolled out flat glass material or lamp tube material, and a "sandwich" block is formed. The use of thick layers, which are subsequently rolled out, ensures the necessary tolerance of the optical individual thicknesses after rolling, since the attainable layer thickness tolerance of the rolling process is to be related to the total thickness of the flat glass after rolling.

The tolerance $\Delta d_i$ of an optical $\lambda/4$ layer is $\Delta d_i = \Delta d$ k. The attainable tolerance $\Delta d$ of the flat glass production amounts in absolute terms to as much as $3/100$ mm for, for example, microscopic cover glasses. For a sandwich block with 400 dielectric double layers averaging two times the microscopic cover glass thickness—namely, $3/10$ mm double layer thickness before rolling—and a required double layer thickness averaging twice the $\lambda/4$ thickness $2d_i = 0.33$ $\mu$m—with a wavelength of 1 $\mu$m and a corresponding average glass refraction index of 1.5 after rolling, and having a required flat glass thickness of 1 mm after rolling, the tolerance to be maintained is about 30 nm per optical layer.

The multilayer stack is arranged between a base glass cover and a base glass bottom. On the one hand, it is the object of the base glass cover and base glass bottom to determine the subsequent flat glass thickness, and on the other hand, it is their object to prevent superficial layer distortions during the rolling process, so that the dielectric multilayer region in-between remains unaffected by the edge distortions of the rolling process. The entire sandwich block has a layer thickness $D = d/k$, where k is the dilatation factor, and d the desired flat glass thickness after the rolling process.

As an example, the dimensions of a sandwich block with 400 dielectric double layers, which is to be rolled out to a 1 mm thick flat glass, are listed before and after rolling.

| Sandwich block dimensions | Before rolling | After rolling |
| --- | --- | --- |
| Individual layer thickness | $0.15 \times 10^{-3}$ m | $0.167 \times 10^{-6}$ m |
| Thickness of 400 double layers | 0.12 m | $0.1336 \times 10^{-3}$ m |
| Base layer thickness | 0.78 m | $0.8664 \times 10^{-3}$ m |
| Sandwich thickness | 0.9 m | $1 \times 10^{-3}$ m |
| Absolute tolerance per layer thickness | $0.03 \times 10^{-3}$ m | $33.3 \times 10^{-9}$ m |
| Dilatation factor | 1/900 | 1/900 |

To be still able to handle in the rolling process the large initial layer thickness of the sandwich block of 90 cm as shown in the example, it is possible to replace the base glass blocks with a plurality of glass plates of the same total thickness, which are then fused together with the sandwich step by step subsequent to a respective partial rolling process.

The further processing of the mirror glass material for the lamp production can be carried out by the existing flat glass production technology. At the end of the production process, the resultant rolled glass can be rolled and manufactured to glass tubes for a lamp production. In this connection, the actual dielectric multilayer, which is located, for example, very close below one of the surfaces of the flat glass, may extend toward the inner surface of the glass tubes, thereby reducing considerably the residual absorption of the infrared radiation of the subsequent lamp bulb.

In the case of the mirror coatings of the art, which are vapor deposited on the outer surface of lamp bulbs, radiation initially passes through the base material from the interior, before the infrared radiation reaches the mirror coating and is reflected. In this instance, the residual absorption in the base material leads to a greater portion of dissipation loss in the energy balance of incandescent lamps with a spectral mirror coating.

The further processing of mirror glass tubes for producing lamps is noncritical. In particular, the fusing or sealing operation of the lamp bulbs as provided in the production process of lamps, leads at most to an upsetting and dilatation of the different glass layers. As a result, the short-wave reflection limit shifts likewise again toward shorter wavelengths and, with that, an increased transmitted loss radiation will not occur.

The possibly increased expenditure for producing the multilayer lamp material in comparison with conventional lamp material with a separate vacuum evaporation of mirror layers will turn out economical because of the absence of costs for a separate mirror coating, and because of the more favorable, possible optimization of the structural shape of lamps from a manufacturing viewpoint. Possible further fields of application of the mirror glass include glasswork on buildings and automobiles. Likewise in this instance, spectral reflection- and transmission characteristics are desired, such as, for example, shielding of heat radiation.

All advantages of the invention enable the production of dielectric multilayer mirrors or mirror coatings, which have so far not been possible from the viewpoint of shaping.

As regards further advantageous improvements and further developments of the teaching according to the invention, the attached claims are herewith incorporated by reference.

Finally, it should be expressly emphasized that the foregoing, merely arbitrarily selected example with, for example, 400 double layers, is used only for explaining the invention, without however limiting same to this example.

What is claimed is:

1. A method of producing a dielectric multilayer mirror coating comprising the steps of
   producing at least two dielectric layers of predetermined initial thicknesses,
   arranging the dielectric layers one above the other to form a stack of layers,
   arranging the stack of layers between two base layers to form a sandwich block,
   reducing the thickness of the sandwich block, while maintaining the thickness ratio or thickness ratios of the dielectric layers relative to one another,
   wherein at least one of the base layers is formed of a plurality of individual layers which are built up by sequentially arranging the individual layers in an overlying relationship, and
   wherein the step of reducing the thickness of the sandwich block includes deforming the individual layers which form the at least one base layer, wherein one of the individual layers is arranged to overlie a preceding layer then partially reducing the thickness of the sandwich block, and repeating the arranging and reducing steps until the last of the individual layers is applied.

2. The method of claim 1 wherein the initial thicknesses of the at least two dielectric layers are different.

3. The method of claim 1 wherein at least one dielectric layer of the stack comprises glass or plastic.

4. The method of claim 1 wherein the at least two dielectric layers have different indices of refraction.

5. The method of claim 1 wherein the at least two dielectric layers form a double layer.

6. The method of claim 5 wherein at least two double layers are stacked.

7. The method of claim 6 wherein the thickness varies from double layer to double layer.

8. The method of claim 1 wherein the step of arranging the dielectric layers one above the other includes a stacking and/or roll-up of the layers.

9. The method of claim 1 wherein the two base layers comprise glass.

10. The method of claim 1 wherein the dielectric layers are joined by fusion after arranging the stack of dielectric layers between two base layers.

11. The method of claim 10 wherein the step of joining the layers by fusion occurs under vacuum.

12. The method of claim 1 wherein the step of reducing the thickness of the sandwich block includes a pressing or rolling or drawing operation.

13. The method of claim 12 wherein the step of reducing the thickness of the sandwich block further includes the application of heat.

14. The method of claim 1 comprising the further subsequent step of forming the resulting block into a tube or curved configuration.

15. The method of claim 14 wherein the step of forming the resulting block into a tube or curved configuration includes positioning the resulting block adjacent an inner surface of the tube or curved configuration.

16. The method of claim 1 comprising the further step of applying the dielectric multilayer mirror coating on one of the base layers.

17. The method of claim 1 wherein the individual layers of the at least one of the base layers are fused together during the step of reducing the thickness of the sandwich block.

* * * * *